(12) United States Patent
Lin

(10) Patent No.: US 8,545,204 B2
(45) Date of Patent: Oct. 1, 2013

(54) MOLD HAVING MOVABLE PLATE-SHAPED CORES

(75) Inventor: I-Thun Lin, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 241 days.

(21) Appl. No.: 12/979,350

(22) Filed: Dec. 28, 2010

(65) Prior Publication Data

US 2012/0058212 A1    Mar. 8, 2012

(30) Foreign Application Priority Data

Sep. 3, 2010 (TW) .............................. 99129857 A

(51) Int. Cl.
*B29C 33/12* (2006.01)
(52) U.S. Cl.
USPC ........................................................ 425/123

(58) Field of Classification Search
USPC .......................................................... 425/123
See application file for complete search history.

(56) References Cited

U.S. PATENT DOCUMENTS

| 6,240,235 B1* | 5/2001 | Uno et al. ...................... 385/137 |
| 2006/0024012 A1* | 2/2006 | Yatsuda et al. ................ 385/129 |

\* cited by examiner

*Primary Examiner* — Robert J Grun
(74) *Attorney, Agent, or Firm* — Altis Law Group, Inc.

(57) ABSTRACT

A mold for fabricating an optical fiber connector is disclosed. The optical fiber connector includes a blind hole for accommodating an optical fiber and an aspherical lens portion for optically coaxial with the optical fiber. The mold includes a rod-shaped core for forming the blind hole and a plate-shaped core. The plate-shaped core includes an aspherical recess for forming the lens portion. The aspherical recess faces the rod-shaped core, and is adjustably movable relative to the first core so as to achieve alignment between the aspherical recess and the rod-shaped core.

9 Claims, 3 Drawing Sheets

MOLD HAVING MOVABLE PLATE-SHAPED CORES

BACKGROUND

1. Technical Field

The present disclosure relates to a mold having movable plate-shaped cores for fabricating an optical fiber connector.

2. Description of Related Art

Optical fiber connectors are widely used as interfaces for high-speed transmission of electronic data between two electronic devices. An optical fiber connector is generally fabricated using an injection mold, and includes a male connector and a female connector coupled with the male connector. The male connector and the female connector each encompasses a lens portion, a blind hole facing the lens portion, and an optical fiber accommodated in the blind hole. How well the lens portion is positioned to be optically coaxial with the optical fiber plays a vital role in the transmission of electronic data. Therefore, a mold for fabricating the optical fiber connector that can ensure precise alignment of the lens portion to be optically coaxial with the optical fiber is needed.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present mold will now be described in detail below and with reference to the drawings.

Figure 1:
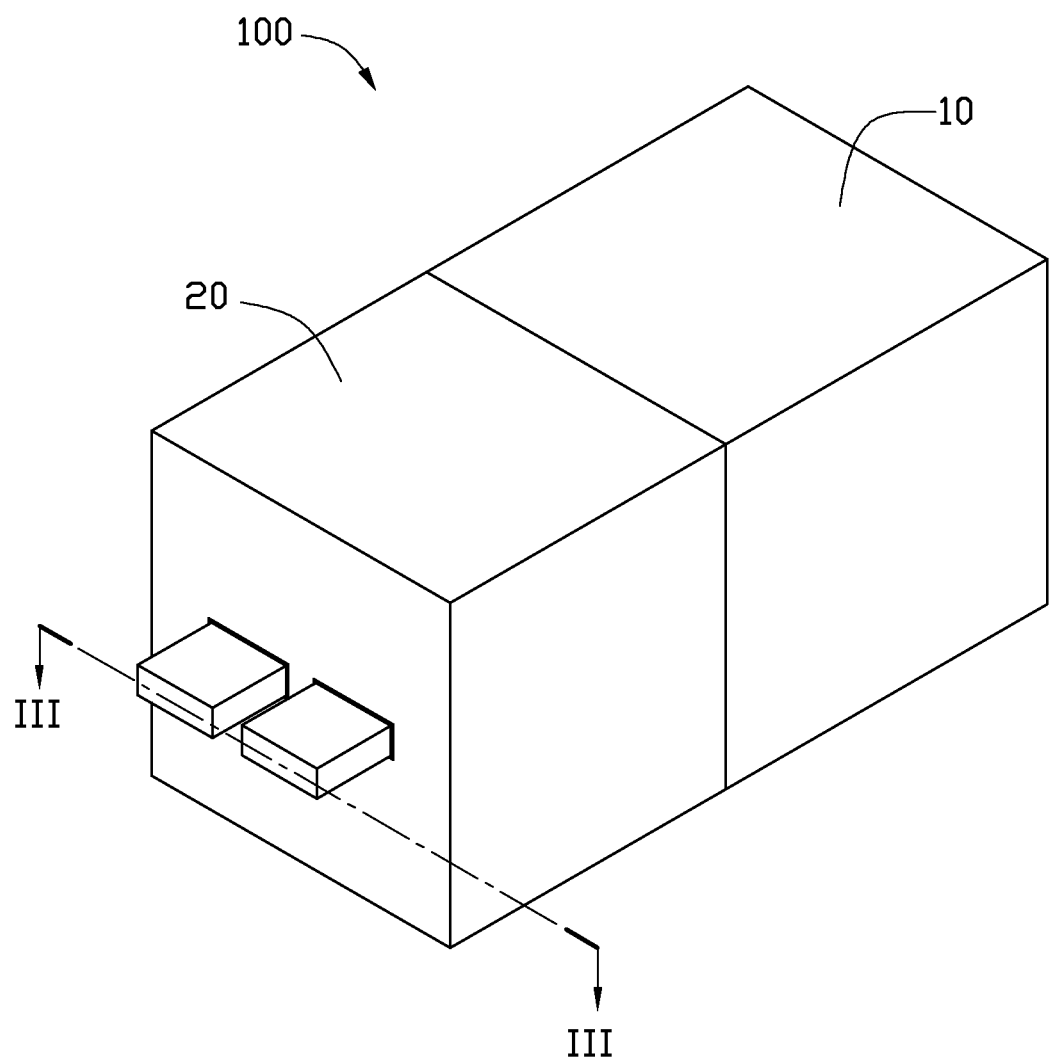
FIG. 1 is an isometric, assembled view of a mold for fabricating an optical fiber connector in accordance with an exemplary embodiment.
Figure 2:
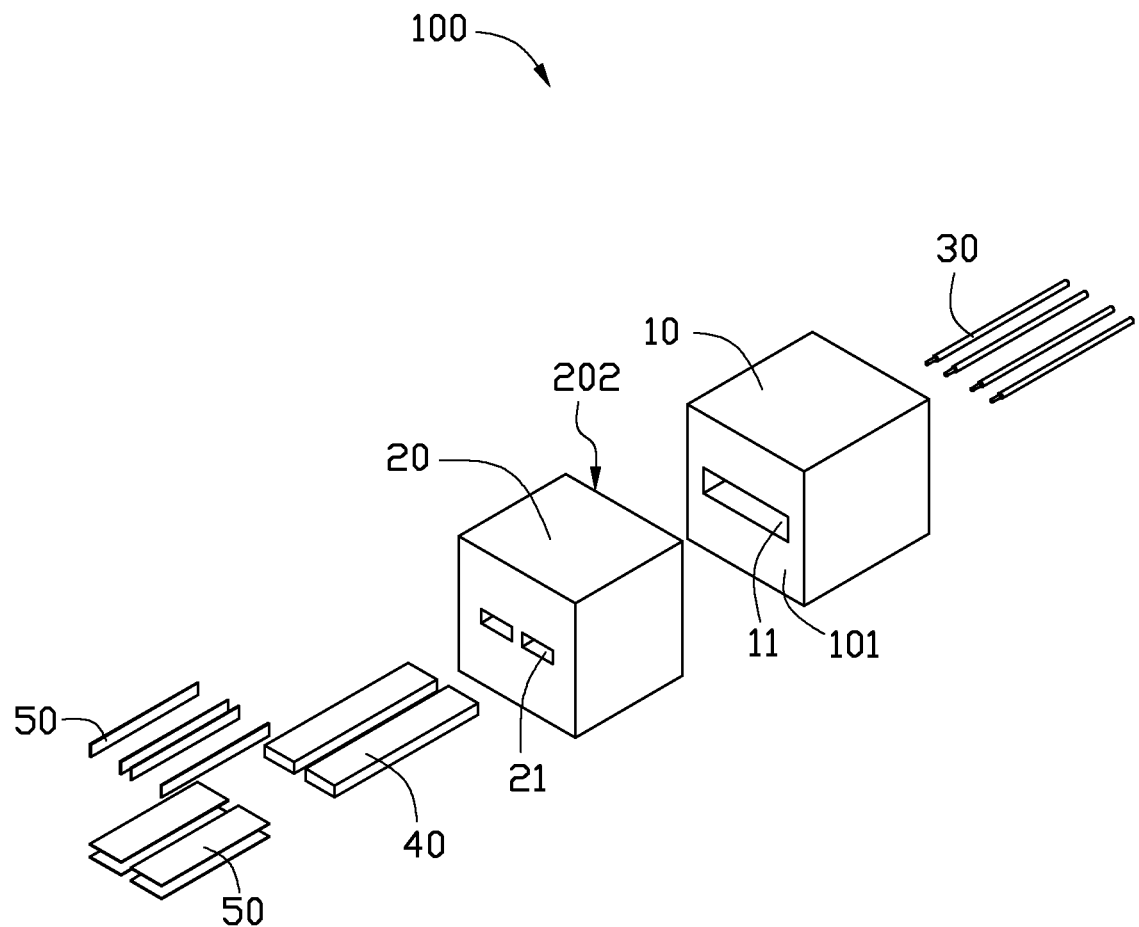
FIG. 2 is an isometric, exploded view of the mold of FIG. 1.
Figure 3:
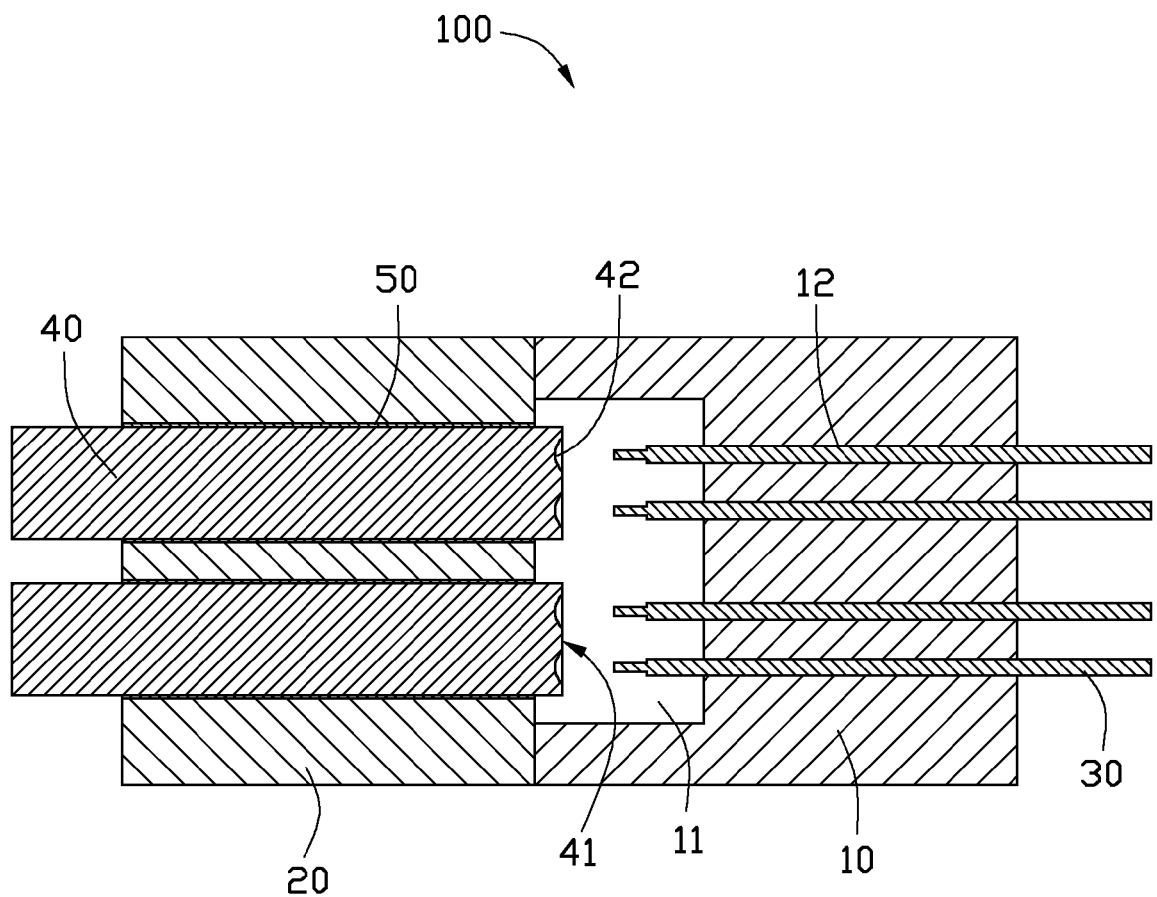
FIG. 3 shows a cross-sectional view of the mold of FIG. 1, taken along line III-III.

Referring to FIGS. 1 and 2, a mold 100 for fabricating an optical fiber connector is shown. The mold 100 includes a male mold 10, a female mold 20 for coupling with the male mold 10, four rod-shaped cores 30 for forming four blind holes of the optical fiber connector, two plate-shaped cores 40 for forming four aspherical lens portions of the optical fiber connector, and eight rectangular spacers 50.

The male mold 10 includes a first parting surface 101 and defines a molding cavity 11 from the first parting surface 101 toward an inner portion thereof. The first cores 30 extend through the male mold 10 with an end portion thereof exposed in the molding cavity 11. The female mold 20 includes a second parting surface 202 for coupling with the first parting surface 101 and defines two separated through holes 21 passing through the second parting surface 202. Each second core 40 has an end surface 41 and defines two separated aspherical recesses 42 from the end surface 41 toward an inner portion thereof. Each aspherical recess 42 has the same shape and size as an aspherical lens portion to be fabricated. The plate-shaped cores 40 each extend through a corresponding through hole 21, with the end surface 41 protruding beyond the second parting surface 202.

Spacers 50 are selectively accommodated in a through hole 21 and contact the second core 20. The number of spacers 50 used are however many are needed for finely adjusting alignment of the corresponding second core 20 relative to the first cores 30 such that each of the cavities 42 can be optically coupled with a corresponding first core 30.

To fabricate the optical fiber connector, the male mold 10 is coupled with the female mold 20 in a manner that has the first parting surface 101 contacting the second parting surface 202. That is, the end surfaces 41 of the plate-shaped cores 40 exposes in the molding cavity 11, and each aspherical recess 42 is optically coupled with a corresponding rod-shaped core 30. Molten plastic is then injected into the molding cavity 11. Hence, the molding cavity 11 and the recesses 42 are filled with the plastic, four aspherical lens portions each having the same size and shape as the recesses 42 and four blind holes each having the same size and shape as the rod-shaped cores 30 are obtained. Next, the female mold 20 is separated from the male mold 10, and the rod-shaped cores 30 are removed. Thereafter, four optical fibers are assembled into the blind holes. In this manner, each optical fiber is optically coaxial with a corresponding lens portion.

In alternate embodiments, the end surface 41 is aligned with the second parting surface 202, and the molding cavity 11 is defined in the female mold 20.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A mold for fabricating an optical fiber connector, comprising:
    a male mold;
    a female mold attached to the male mold, the male mold and the female mold cooperatively defining a molding cavity, the female mold having a through hole in communication with the molding cavity;
    a plurality of rod-shaped cores extending through the male mold, an end portion of each rod-shaped core exposed in the molding cavity;
    a plate-shaped core extending through the through hole, the plate-shaped core having a distal end exposed in the molding cavity and a plurality of aspherical recesses defined in the distal end, the plate-shaped core being adjustably movable relative the rod-shaped cores; and
    a plurality of spacers selectively disposed between the plate-shaped core and the female mold in the through hole, the spacers configured for adjusting and maintaining alignment between the rod-shaped cores and the aspherical recesses of the plate-shaped core.

2. A mold for fabricating an optical fiber connector, the mold comprising:
    a first mold including a first parting surface and a cavity defined in the first parting surface;
    a second mold including a second parting surface, the second mold attached to the first mold with the first parting surface contacting the second parting surface;
    a plurality of rod-shaped cores extending through the first mold, an end portion of each rod-shaped core exposed in the cavity; and
    a plate-shaped core extending through the second mold and protruding beyond the second parting surface, the plate-shaped core comprising an end face and a plurality of recesses defined in the end face, the plate-shaped core being adjustably movable relative to the rod-shaped cores so as to achieve alignment between the recesses and the rod-shaped cores.

3. The mold of claim 2, further comprising a plurality of spacers for being selectively sandwiched between the second mold and the plate-shaped core.

4. The mold of claim 1, wherein each of the aspherical recesses is optically coupled with a corresponding one of the rod-shaped cores.

5. The mold of claim 1, wherein another end portion of each rod-shaped core is opposite to the end portion exposed in the molding cavity and is positioned outside the male mold.

6. The mold of claim 1, wherein another distal end of the plate-shaped core is opposite to the distal end exposed in the molding cavity and is positioned outside the female mold.

7. The mold of claim 2, wherein each of the recesses is aspherical-shaped and is optically coupled with a corresponding one of the rod-shaped cores.

8. The mold of claim 2, wherein another end portion of each rod-shaped core is opposite to the end portion exposed in the cavity and is positioned outside the first mold.

9. The mold of claim 2, wherein another end face of the plate-shaped core is opposite to the end face defining the recesses and is positioned outside the second mold.

* * * * *